Sept. 4, 1962    H. E. SULGER    3,052,335
ELECTROMAGNETIC CLUTCH
Filed March 8, 1960
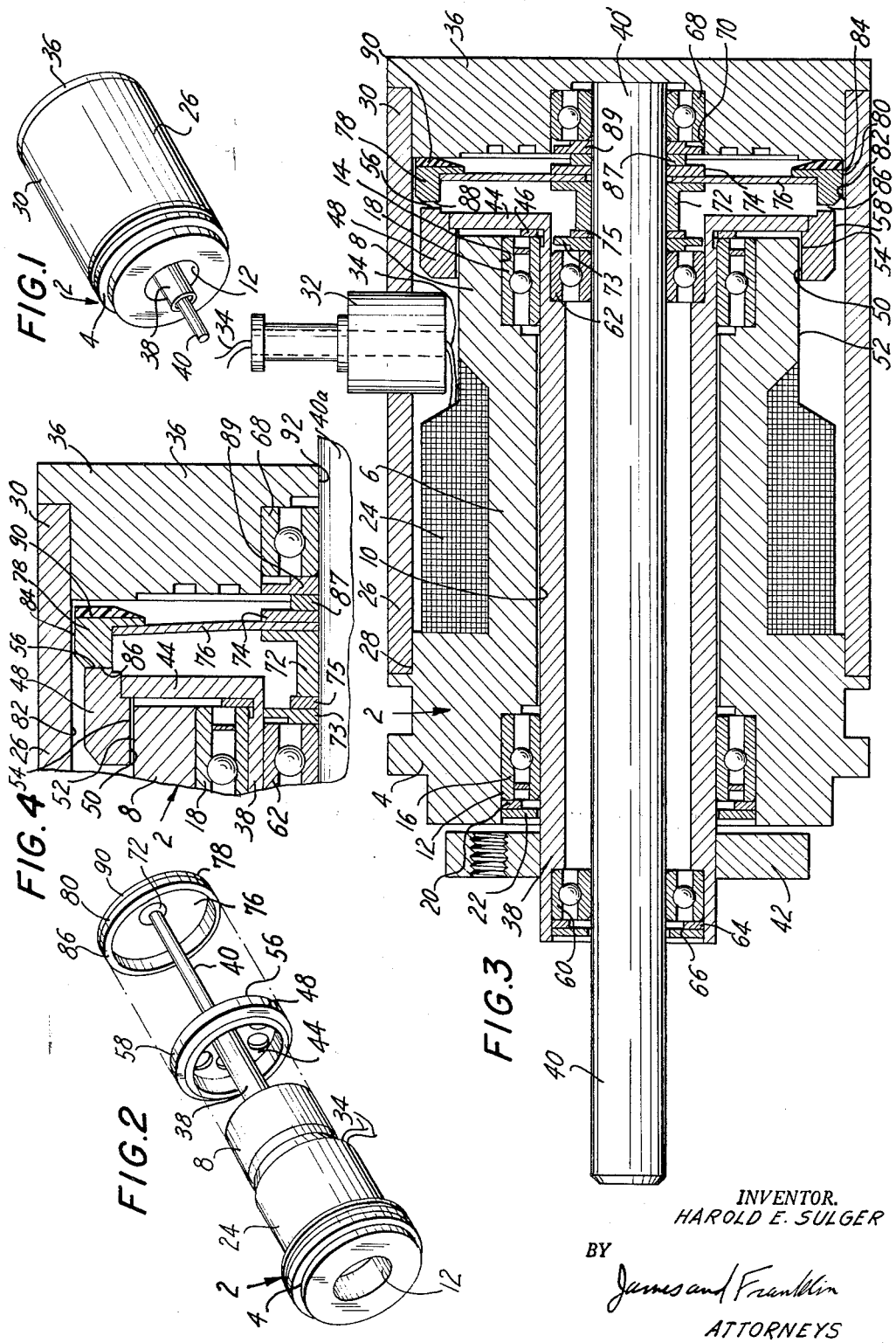
INVENTOR.
HAROLD E. SULGER
BY
James and Franklin
ATTORNEYS

United States Patent Office 3,052,335
Patented Sept. 4, 1962

3,052,335
ELECTROMAGNETIC CLUTCH
Harold E. Sulger, Plainview, N.Y., assignor to Dynamic Instrument Corp., Westbury, N.Y., a corporation of New York
Filed Mar. 8, 1960, Ser. No. 13,597
6 Claims. (Cl. 192—84)

The present invention relates to a novel structure for an electromagnetic clutch.

Electromagnetic clutches, with and without brake features, are in wide use in a variety of applications, such as servo systems. They comprise a pair of shafts, which may for convenience of designation be termed an input shaft and an output shaft respectively, those shafts having parts operatively connected thereto which are normally out of engagement with one another, thereby permitting the two shafts to rotate independently. In this condition of the device rotation of the input shaft is not transmitted to the output shaft. When an energizing coil is connected to a source of external electric power a magnetic field is set up within the device which causes the two parts to move into clutched engagement with one another, as a result of which the two shafts are operatively connected together, so that rotation of the input shaft causes the output shaft to rotate.

It is imperative in many applications (e.g. precision servo systems) that the clutches conform to rigorous operating specifications, and that they thus perform reliably over a long period of time. It is often also required that they be of comparatively small size and weight. These two requirements are often antithetical, particularly insofar as reliability is concerned. The smaller the device, the smaller must be the bearings for the shafts. The smaller these bearings, the more susceptible they are to wear and to undesirable loading. Thrust loading of the bearings is particularly deleterious, giving rise to excessive frictional resistance to shaft rotation and hence to excessive wear. Resistance to shaft rotation is also undesirable for reasons apart from wear. Such resistance increases the break-away or drag torque of the device, and therefore increases the load on the driving motor of the system, which may itself be very small and have a low torque output. If the drag torque of the entire system driven by the motor is too high for the motor, the overall system will have a sluggish response which is undesirable and often inadmissible. The breakaway torque of the electromagnetic clutch, when engaged, may represent a substantial proportion of the total break-away torque of the system.

In the past devices of this general nature have been so constructed as to produce an appreciable thrust loading on the shaft bearings. It is the prime object of the present invention to substantially eliminate this disadvantage, thereby to produce a clutch with a minimal break-away torque and with a higher degree of reliability and a longer life, for a given size, than has heretofore been thought possible.

To accomplish this result the structure of the clutch has been modified in order to produce, by simple and easily manufactured parts, a magnetic circuit in which the operating air gaps, and particularly those air gaps which exist when the input and output shafts are in clutched operative engagement, extend in such a direction as not to cause any appreciable thrust loading on the bearings in which the input and output shafts are mounted. More specifically, the parts are so designed and interrelated that the air gaps between the rotary and stationary parts of the magnetic circuit are substantially at right angles to the axes of the input and output shafts. The rotating parts are necessarily attracted toward the startionary parts across those air gaps, but in the design of the instant invention, the magnetic forces exerted on the magnetic parts do not impart any appreciable forces on the shaft bearings in the direction of the axes of the shaft. Moreover, the resultant radial magnetic forces exerted on the rotating parts of the magnetic structure are substantially uniform completely around those rotating parts, thus tending to balance the shafts within their bearings in a radial direction. This makes for freer shaft rotation and to some extent minimizes run-out or "wobble" of those portions of the shaft which extend from the clutch.

To the accomplishment of the above, and to such other objects as may hereinafter appear, the present invention relates to the construction of an electromagnetic clutch as defined in the appended claims, and as described in this specification, taken together with the accompanying drawings in which:

FIG. 1 is a three-quarter perspective view of one embodiment of the present invention;

FIG. 2 is a three-quarter perspective exploded view of some of the operative portions of the clutch, one end cap and the magnetic return structure physically associated therewith being eliminated;

FIG. 3 is a diametrical cross-sectional view, on an enlarged scale, of the clutch, the parts being shown in declutched position; and FIG. 4 is a fragmentary cross-sectional view showing the clutch parts in engaged or clutched position, a double-ended modification being specifically illustrated.

In the form here specifically disclosed the clutch comprises an elognated magnetic core generally designated 2 formed of some suitable magnetic material such as Armco iron, that core 2 having a wide end portion 4, a narrow intermediate portion 6, and narrow end portion 8, the outer diameter of the end portion 8 being less than the outer diameter of the end portion 4. An axial passage 10 extends through the core 2, and countersunk areas 12 and 14 are formed at the ends of the passage 10, shaft bearings 16 and 18 being received in the countersunk areas 12 and 14 respectively. The bearing 16 is held in place by means of a retaining washer 20, outside which shield 22 is mounted.

A wire coil 24 is wound around the intermediate portion 6 of the core 2. A generally tubular element 26 formed of suitable magnetic material such as Armco iron extends around the coil 24, is secured to the core end 4 at 28 in any appropriate manner, and extends out axially beyond the core end 8, as at 30. A sealed fitting 32 passes through the element 26, and the leads 34 from the winding 24 extend through the fitting 32 to the exterior of the device, where they may be connected to any suitable electrical control circuit. An end cap 36, preferably formed of non-magnetic material such as anodized aluminum, is secured to and is carried by the end 30 of the element 26, closing the right-hand end of the clutch.

In the form here specifically disclosed in FIGS. 1–3, the clutch is of the single-ended type in which both the input shaft 38 and the output shaft 40 extend from the same end of the device (the left-hand end as shown in the drawings). (It will be appreciated that the designation of the shafts 38 and 40 as "input" and "output" shafts respectively is arbitrary, and that either shaft could be used as the input shaft, the other shaft then functioning as the output shaft.) The input shaft 38 is in the form of a hollow cylinder formed of some suitable non-magnetic material such as stainless steel, which passes through and is freely rotatable within the axial passage 10 in the core 2, and which is journalled for rotation in the bearings 16 and 18. That portion of the shaft 38 which extends out beyond the left-hand end 4 of the core 2 may be provided, as is shown in FIG. 3, with an adapter 42 fastened thereon, by means of which a gear may be secured to the shaft 38. The axially inner end of the shaft 38 is provided with a radially outwardly extending flange 44 located beyond the end 8 of the core 2 and between the core end 8 and the end cap 36, a spacer ring 46 being interposed between the flange 44 and the inner race of the bearing 18. The flange 44 carries on its outer periphery a ring 48 formed of some suitable magnetic material such as magnetic stainless steel. This ring 48 extends axially to the left of the flange 44, as viewed in the drawings, and has a radially inner surface 50 which is concentric with and closely spaced relative to the outer surface 52 of the core end 8, an air gap 54 being defined between the surfaces 50 and 52. The ring 48 is also provided with an axially facing surface 56 which defines its clutch face. It will be noted that the radial spacing between the circumferentially outer surface 58 of the ring 48 and the circumferentially inner surface 82 of the element 26 is appreciably greater than the width of the air gap 54 between the surfaces 50 and 52.

Bearings 60 and 62 are mounted inside the tubular shaft 38 at each end thereof, the bearing 60 being held in place by means of retaining ring 64 and shield 66. The output shaft 40 passes through the tubular shaft 38 and is journalled in the bearings 60 and 62, its axially inner end 40' being journalled in bearing 68 received within a recess 70 in the end cap 36. A hub 72 is fast on the shaft 40, and is spaced from the bearing 62 by means of a shield 73 and spacer ring 75, both of which may be formed of stainless steel. Clamped between the hub 72 and auxiliary hub section 74 is a resilient disc 76 formed of some suitable non-magnetic material such as stainless steel, which disc 76 carries ring 78 formed of a suitable magnetic material such as magnetic type stainless steel. The ring 78 has a circumferentially outer surface 80 which is closely spaced relative to the circumferential inner surface 82 of the element 26, an air gap 84 being defined therebetween. The ring 78 is also provided with an axially facing surface 86 directed toward the ring 48, that surface 86 constituting the clutch face of the ring 78. A spacer ring 87 and shield 89 space the auxiliary hub section 74 from the bearing 68. The resiliency of the disc 76 is such as normally to move the ring 78 to the right as shown in FIG. 3, so that the facing surfaces 56 and 86 of the rings 48 and 78 are spaced from one another by an air gap 88.

When it is desired that the output shaft 40 should be braked when the clutch is disengaged, the right hand surface of the ring 78 may be provided with a plastic frictional coating 90 which engages the inner surface of the end cap 36. (This braking action is of course optional, and the output shaft 40 could, if desired, be made free to rotate if the normal action of the disc 76 were such as to maintain the ring 78 out of engagement with the end cap 36.)

When clutching is desired, the coil 24 is energized by passing a current through the leads 34. This will set up a magnetic field which may be traced as follows: From the intermediate portion 6 of the core 2 to the right to the end portion 8 thereof, then radially outwardly across the air gap 54 into the ring 48, then axially across the air gap 88 into the ring 78, then radially outwardly across the air gap 84 into the cylinder 26, to the left along the element 26, down into the left-hand end 4 of the core 2, and back to the intermediate portion 6 of the core 2. The passage of the magnetic field across the air gap 88 will pull the ring 78 to the left into engagement with the ring 48, against the resiliency of the disc 76, the facing ring clutch surfaces 86 and 56 engaging. At the same time the frictional coating 90 carried by the ring 78 is moved out of engagement with the end cap 36, all as shown in FIG. 4. The rings 48 and 78 will therefore be caused to rotate together, thus connecting the shafts 38 and 40 in clutched engagement, so that rotation of one will be transmitted to the other.

While the clutch is thus engaged, the rings 48 and 78 will be rotating relative to and radially spaced from the core end 8 and the element end 30, with air gaps 54 and 84 therebetween. There will therefore be a constant force exerted across those air gaps, tending to draw the moving parts toward the stationary parts. However, since those air gaps 54 and 84 are radial in direction, the forces deriving from this magnetic attraction will be correspondingly radial in direction. None of those forces will tend to move either of the shafts 38 or 40 axially. Consequently, those forces will not exert any thrust loading on any of the bearings. Since the surfaces 50, 52, 80 and 82 are all circular and concentric, the forces exerted across the air gaps 54 and 84 will tend to rotationally balance the rings 48 and 78, and hence the shafts 38 and 40 to which they are respectively connected. The only axial loading on the bearings will be that derived from the flexing of the resilient disc 76 which carries the ring 78, and that force will be substantially negligible.

If double-ended operation is desired, the end cap 36 can be provided with a central aperture 92 through which the left hand end 40a of the shaft 40 can extend (see FIG. 4).

Because of the design of the magnetic circuit, with the resultant lack of thrust loading on the bearings when the clutch is engaged, the clutch will have a truly minimal break-away or drag torque, thus reducing the load on the driving motor and greatly increasing the life, and hence the reliability, of the device. All of the air gaps are concentrated at one end of the clutch, the circumferential lengths of the clutch surfaces 56 and 86 are maximized for given outer dimensions of the clutch, the shafts are rotatably mounted in bearings axially spaced from one another to a maximum degree, the axial lengths of the radial air gaps are limited to small values, and the number of parts which must be accurately machined is held to a minimum. Hence minimal expense and simplicity of structure are achieved with an improvement in operating characteristics.

While but a single embodiment of the present invention has been here specifically disclosed, it will be apparent that many variations may be made therein, both as to basic style (single or double end operation), and specific structural details, all without departing from the spirit of the invention as defined in the following claims:

I claim:

1. An electromagnetic clutch comprising a support, first and second shafts journaled on said support, first and second magnetic clutch elements operatively connected to said first and second shafts respectively for rotation therewith, relatively fixed magnetic structure associated with said magnetic elements to define a substantially closed magnetic circuit therewith, said magnetic elements both being located with their magnetically operative parts substantially completely at one end of said fixed magnetic structure, said magnetic elements being normally closely axially spaced from one another to define therebetween a first flux-transmitting air gap, said magnetic elements being closely radially spaced respectively inwardly and outwardly from portions of said fixed magnetic structure at said one end of said fixed magnetic structure, thereby to define second and third radial flux-transmitting air gaps between said fixed magnetic structure and said magnetic elements respectively.

2. A flux-conducting electromagnetic clutch comprising a magnetic core having an axial opening therethrough, an energizing coil radially outside said core and intermediate the ends of said core, magnetic return structure radially outside said coil, operatively physically and magnetically connected to said core at one end thereof and radially spaced from and projecting axially beyond said core at the other end thereof to define with said core a generally radial gap through which magnetic field is to pass, an end cap axially spaced from said other end of said core and supported by the axially projecting portion of said magnetic return structure, input and output shafts, at least one of which is journaled in said end cap and at least one of which passes through said axial opening in said core, first and second clutch elements located in the space between said end cap and said other end of said core and connected to said shafts respectively for rotation therewith, said clutch elements including first and second magnetic parts both located at said other end of said core and in said gap, said first and said second magnetic parts being normally closely axially spaced from one another to define therebetween a first flux-transmitting air gap, said magnetic parts being relatively movable in the direction of said axial flux-transmitting air gap into clutched engagement with one another, one of said magnetic parts being closely outwardly radially spaced from said core to define a substantially radial flux-transmitting air gap therebetween, the other of said magnetic parts being closely radially spaced from said magnetic return structure so as to define a substantially radial flux-transmitting air gap therebetween.

3. An electromagnetic clutch comprising a support, first and second essentially non-magnetic shafts journaled on said support, relatively fixed magnetic structure on said support and comprising a radially inner flux-conducting first portion having an end and a second flux-conducting portion extending axially at least substantially to said end and being radially outwardly spaced from said first portion to define a substantially radial gap therebetween, first and second magnetic clutch elements operatively connected to said first and second shafts respectively for rotation therewith, radially outwardly spaced from said shafts and located at said end of said fixed magnetic structure and in said gap, said elements and said fixed magnetic structure defining a substantially closed magnetic circuit, said magnetic elements being normally closely axially spaced from one another to define therebetween a first flux-transmitting air gap, that surface of one of said magnetic elements which is closest to said fixed magnetic structure being closely radially spaced from said first portion of said fixed magnetic structure to define therebetween a radial second flux-transmitting air gap, that surface of the other of said magnetic elements closest to said fixed magnetic structure being closely radially spaced from said second portion of said fixed magnetic structure and being closer thereto than any surface of said one of said magnetic elements, thereby to define between itself and said second portion of said fixed magnetic structure a radial third flux-transmitting air gap.

4. An electromagnetic clutch comprising a support, first and second essentially non-magnetic shafts journaled on said support, relatively fixed magnetic structure on said support and comprising a radially inner flux-conducting first portion having an end and a second flux-conducting portion extending axially at least substantially to said end and being radially outwardly spaced from said first portion to define a substantially radial gap therebetween, first and second magnetic clutch elements operatively connected to said first and second shafts respectively for rotation therewith, radially outwardly spaced from said shafts and located at said end of said fixed magnetic structure and in said gap, said elements and said fixed magnetic structure defining a substantially closed magnetic circuit, said magnetic elements being normally closely axially spaced from one another to define therebetween a first flux-transmitting air gap, that surface of one of said magnetic elements which is closest to said fixed magnetic structure being closely outwardly radially spaced from said first portion of said fixed magnetic structure to define therebetween a radial second flux-transmitting air gap, that surface of the other of said magnetic element closest to said fixed magnetic structure being closely radially spaced from said second portion of said fixed magnetic structure and being closer thereto than any surface of said one of said magnetic elements, thereby to define between itself and said second portion of said fixed magnetic structure a radial third flux-transmitting air gap.

5. An electromagnetic clutch comprising a support, first and second essentially non-magnetic shafts journaled on said support, relatively fixed magnetic structure on said support and comprising a radially inner flux-conducting first portion having an end and a second flux-conducting portion extending axially at least substantially to said end and being radially outwardly spaced from said first portion to define a substantially radial gap therebetween, first and second magnetic clutch elements operatively connected to said first and second shafts respectively for rotation therewith, radially outwardly spaced from said shafts and located at said end of said fixed magnetic structure and in said gap, said elements and said fixed magnetic structure defining a substantially closed magnetic circuit, said magnetic elements being normally closely axially spaced from one another to define therebetween a first flux-transmitting air gap, that surface of one of said magnetic elements which is closest to said fixed magnetic structure being closely radially spaced from said first portion of said fixed magnetic structure to define therebetween a radial second flux-transmitting air gap, that surface of the other of said magnetic elements closest to said fixed magnetic structure being closely inwardly radially spaced from said second portion of said fixed magnetic structure and being closer thereto than any surface of said one of said magnetic elements, thereby to define between itself and said second portion of said fixed magnetic structure a radial third flux-transmitting air gap.

6. An electromagnetic clutch comprising a support, first and second essentially non-magnetic shafts journaled on said support, relatively fixed magnetic structure on said support and comprising a radially inner flux-conducting first portion having an end and a second flux-conducting portion extending axially at least substantially to said end and being radially outwardly spaced from said first portion to define a substantially radial gap therebetween, first and second magnetic clutch elements operatively connected to said first and second shafts respectively for rotation therewith, radially outwardly spaced from said shafts and located at said end of said fixed magnetic structure and in said gap, said elements and said fixed magnetic structure defining a substantially closed magnetic circuit, said magnetic elements being normally closely axially spaced from one another to define therebetween a first flux-transmitting air gap, that surface of one of said magnetic elements which is closest to said fixed magnetic structure being closely outwardly radially spaced from said first portion of said fixed magnetic structure to define therebetween a radial second flux-transmitting air gap, that surface of the other of said magnetic element closest to said fixed magnetic structure being closely inwardly radially spaced from said second portion on said fixed magnetic structure and being closer thereto than any surface of said one of said magnetic elements, thereby to define between itself and said second portion of said fixed magnetic structure a radial third flux-transmitting air gap.

References Cited in the file of this patent

UNITED STATES PATENTS

| | | |
|---|---|---|
| 2,401,003 | Lear | May 28, 1946 |
| 2,618,368 | Hoover | Nov. 18, 1952 |
| 2,857,998 | Harter | Oct. 28, 1958 |
| 2,884,107 | Frankel | Apr. 28, 1959 |
| 2,899,037 | Pierce | Aug. 11, 1959 |
| 2,919,777 | Walter | Jan. 5, 1960 |
| 2,937,729 | Sperr | May 24, 1960 |
| 2,954,859 | Rabinow | Oct. 4, 1960 |
| 2,965,203 | White | Dec. 20, 1960 |
| 2,966,977 | Johnson | Jan. 3, 1961 |
| 3,016,118 | Zatsky | Jan. 9, 1962 |